（12）United States Patent
Yellin et al.

(10) Patent No.: US 8,351,367 B2
(45) Date of Patent: Jan. 8, 2013

(54) SIGNALING OF UNUSED RESOURCES (75) Inventors: Daniel Yellin, Ra'anana (IL); Adoram Erell, Herzlia (IL); Ronen Mayrench, Ra'anana (IL); Ezer Melzer, Tel Aviv (IL)

(73) Assignee: Marvell World Trade Ltd., St. Michael (BB)

( * ) Notice: Subject to any disclaimer, the term of this patent is extended or adjusted under 35 U.S.C. 154(b) by 510 days.

(21) Appl. No.: 12/414,046

(22) Filed: Mar. 30, 2009

(65) Prior Publication Data

US 2009/0268630 A1 Oct. 29, 2009

Related U.S. Application Data (60) Provisional application No. 61/047,555, filed on Apr. 24, 2008, provisional application No. 61/097,015, filed on Sep. 15, 2008.

(51) Int. Cl.
*H04B 1/10* (2006.01)
(52) U.S. Cl. ........ 370/317; 370/208; 370/281; 370/295; 370/319; 370/332; 370/344; 370/349; 370/480; 455/59; 455/67.13; 455/216; 455/296; 455/501; 375/260
(58) Field of Classification Search .................. 370/208, 370/281, 295, 310.2, 317, 319, 328–339, 370/343, 344, 349, 480; 455/59, 67.13, 216, 455/296, 450, 451, 452, 501, 509; 375/260
See application file for complete search history.

(56) References Cited

U.S. PATENT DOCUMENTS

| 8,229,441 | B2 * | 7/2012 | Callard et al. ................ 455/446 |
| 2005/0002324 | A1 | 1/2005 | Sutivong et al. |
| 2007/0183522 | A1 | 8/2007 | Garrett et al. |
| 2009/0088148 | A1 * | 4/2009 | Chung et al. .................. 455/423 |
| 2009/0268680 | A1 * | 10/2009 | Nam et al. .................... 370/329 |
| 2010/0182903 | A1 * | 7/2010 | Palanki et al. ................ 370/225 |
| 2010/0216475 | A1 * | 8/2010 | Hoole .......................... 455/436 |

OTHER PUBLICATIONS

International Search Report for Application No. PCT/IB2009/005375 (corresponding hereto) mailed Sep. 2, 2009; 2 pages.
R1-081467; 3GPP TSG-RAN WG1 Meeting #52bis; Shenzhen,China, 31$^{st}$ of Mar. 4$^{th}$ of Apr. 2008; CQI estimation methodology; Nokia Siemens Networks, Nokia; 6 pages.
R1-080887; 3GPP TSG RAN WG1 #52; Sorrento, Italy, Feb. 11-15, 2008; CQI Measurement Methodology; Ericsson; 7 pages.
R1-081539; 3GPP TSG-RAN WG1 #52bis; Shenzhen, China, Mar. 31-Apr. 4, 2008; UE Interference Measurement for CQI; Ericsson; 4 pages.
R1-081525; Shenzhen, China, Mar. 31-Apr. 4, 2008; PDCCH contents; Ericsson; Stefan Parkvall; 7 pages.

* cited by examiner

*Primary Examiner* — Hoon J Chung (57) ABSTRACT

A user device on a wireless network includes a receiver, a noise detector and a noise determiner. The receiver receives downlink data communications from a base station that indicates an allocation of time/frequency resource blocks at least to user devices that are communicating with the base station. The noise detector measures noise in a time/frequency resource block, comprising plural time/frequency bins, that is not allocated to one of the user devices. The noise determiner determines a level of interfering noise based on noise in the resource block that is not allocated to one of the user devices.

28 Claims, 5 Drawing Sheets

SIGNALING OF UNUSED RESOURCES

CROSS-REFERENCE TO RELATED APPLICATIONS

This application claims benefit from U.S. Provisional Patent Applications 61/047,555, filed Apr. 24, 2008, and 61/097,015 filed Sep. 15, 2008, which are hereby incorporated in their entirety by reference.

FIELD OF THE INVENTION

The present invention generally relates to wireless communication, and in particular to channel quality estimation in cellular networks.

BACKGROUND

The 3rd Generation Partnership Project (3GPP) is presently defining various communication protocols for the emerging next generation, LTE (Long Term Evolution) Advanced cellular telecommunication standard, which employs an air interface formally referred to as E-UTRA (Evolved-UMTS Terrestrial Radio Access).

Figure 1A:
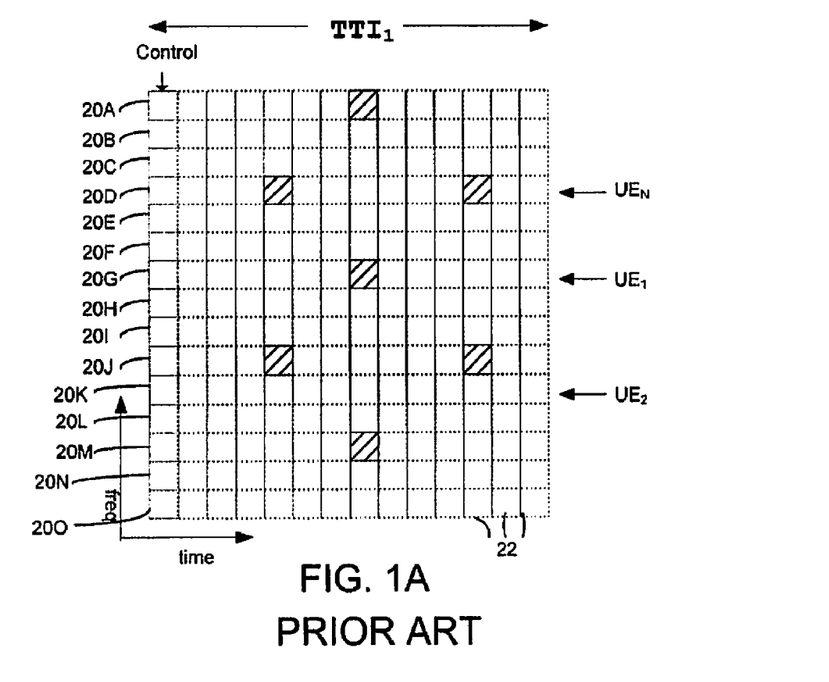
FIGS. 1A and 1B are illustrations of two examples of prior art allocations of time-frequency space in two transmission time intervals (TTIs)
Figure 1B:
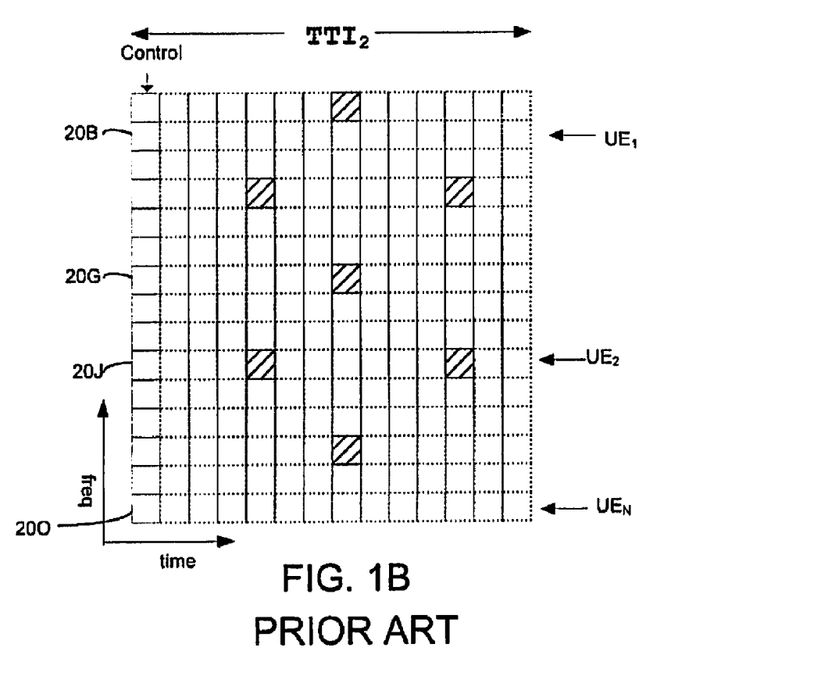

LTE standards employ OFDM transmission between an eNode-B base station and multiple user equipment devices (UEs) in which an available spectrum is divided into numerous relatively narrow bandwidth carriers, each on a different frequency. An example of a transmission time interval is shown in FIGS. 1A and 1B, to which reference is now made. Multiple carriers are located on the Y axis and time is shown on the X axis. In FIGS. 1A and 1B, three carriers within the TTI (transmission time interval) are allocated, one each to three user equipment devices, $UE_1$, $UE_2$ and $UE_N$. In E-UTRA terminology, each carrier is designated as a physical resource block or PRB 20. As can be seen by the grid, each PRB 20 is separated into time-frequency bins 22, over which a portion of a message is sent.

FIG. 1A illustrates an example of a first TTI, $TTI_1$ and FIG. 1B illustrates an example of a second, TTI, $TTI_2$. During each time interval TTI, the base station allocates PRBs 20 to the UEs and to the control channel. The allocations of PRBs 20 may change from TTI to TTI. Thus, in FIGS. 1A and 1B, the three UEs are allocated to different PRBs 20. In FIGS. 1A and 1B 15 PRBs 20 are shown. The 15 PRBs are labeled 20A-20O and PRBs 20D, 20G and 20K and are allocated to $UE_N$, $UE_1$ and $UE_2$, respectively. In FIG. 1B, only the allocated PRBs 20 are labeled. Thus, PRB 20B is allocated to $UE_1$, PRB 20J is allocated to $UE_2$ and PRB 20O is allocated to $UE_N$.

A downlink control channel (Control) from the base station is also transmitted in every TTI. However, as can be seen in FIGS. 1A and 1B, the first column (or first few columns) of the transmission time interval is allocated to the control channel. This allocation corresponds to a transmission over all frequencies. The control channel carries the PRB allocations to the UEs in the current TTI. It also may pass common messages from the base station to the UEs.

Figure 1C:
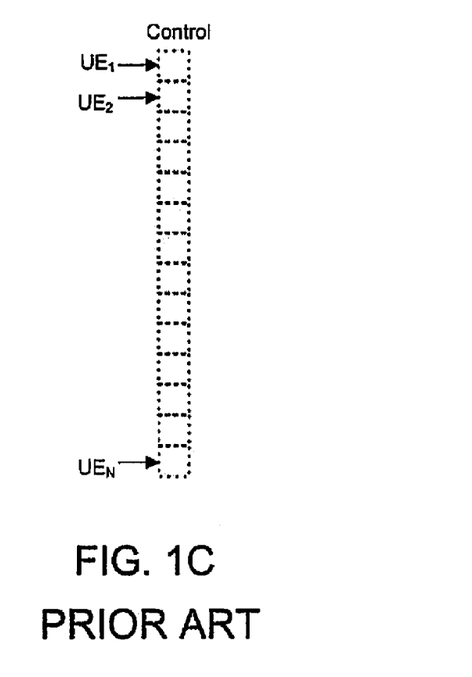
FIG. 1C is an illustration of a prior art example of a downlink control channel allocation.

FIG. 1C illustrates an example of a control structure. Within the transmission are pointers for each UE, pointing to the PRBs allocated to it for the current TTI. In the illustration of FIG. 1C, the pointers are listed in order, from $UE_1$ to $UE_N$. However, this need not be the case. Each pointer is encoded with the ID number of each UE and thus, each UE, upon reading the control allocation, need only decode each pointer with its ID number. All pointers which successfully decode are pointers for that UE.

In order to support high data throughput, it is important for a network to perform effective scheduling and data transmission over the multiple carriers. Data transmission from the eNode-B base station to the UE may utilize, for example, different modulation and coding schemes (MCSs) as a function of channel quality. Other transmission parameters may also be affected by channel quality.

Estimation of channel quality typically involves separate power measurements of signals and of the interference or noise at any given moment. The UEs transmit these measurements to the base station, typically in the form of a channel quality indicator (CQI) signal, and the base station may transmit instructions such that throughput is maximized, taking into account channel quality. For example, more optimal MCS, antenna arrangements and the like may be used. However in some OFDM networks, such as LTE networks, interference experienced by any particular UE may differ among the time/frequency bins and may be affected, among other things, by the network traffic load, signals from neighboring cells and the like. All of these influences may impact on interference measurement and related CQI reports.

One conventional approach for estimating the interference is based on measurement of the noise at specified RS (reference signal) bins during which the base station transmits a reference signal, that is defined by known symbols, for use in channel estimation. Such an approach has the disadvantage that the interference at RS bins may be systematically different than interference at pertinent data bins.

According to another conventional approach, multiple sparse "holes", shown by hashing in FIGS. 1A and 1B, are distributed at fixed locations throughout the time-frequency space in a TTI. Instead of transmitting RS symbols, the base station does not transmit anything in these specified holes. Since the holes are not allocated for signal transmission, UEs can readily estimate the interference in these holes, which corresponds to noise. This conventional approach, however, reduces available transmission capacity in the time/frequency bins allocated to transmitting data. In FIGS. 1A and 1B, the holes may be found in PRBs 20A, 20D, 20G, 20J and 20M. In FIG. 1A, this reduces the available transmission capacity of $UE_N$ and $UE_1$. In FIG. 1B, the holes affect $UE_2$ and reduce its transmission capacity.

SUMMARY

There is therefore provided, in accordance with an embodiment of the present disclosure, a method for communication by a user device on a wireless network. The method includes receiving downlink communications from a base station that indicates an allocation of time/frequency resource blocks at least to user devices that are communicating with the base station, measuring noise in a time/frequency resource block, comprising plural time/frequency bins, that is not allocated to one of the user devices and determining a level of interfering noise based on noise in the resource block that is not allocated to one of the user devices.

Further, in accordance with an embodiment, the measuring is performed in at least one time/frequency resource block that is signaled as being not allocated to one of the user devices for transmission.

Still further, in accordance with an embodiment, the measuring is performed in at least one time/frequency resource block that is signaled as being available to other user devices.

Moreover, in accordance with an embodiment, the determining includes averaging the amount of noise from multiple time periods.

Additionally, in accordance with an embodiment, the receiving includes receiving allocations designated for a virtual user device.

Further, in accordance with an embodiment, the receiving includes searching for the allocations to the virtual user device in either a user search space or a common search space of an allocation channel.

Additionally, in accordance with an embodiment, the noise is measured within different time/frequency resources.

There is also provided, in accordance with an embodiment of the present disclosure, a user device on a wireless network. The user device includes a receiver, a noise detector and a noise determiner. The receiver receives downlink data communications from a base station that indicates an allocation of time/frequency resource blocks at least to user devices that are communicating with the base station. The noise detector measures noise in a time/frequency resource block, comprising plural time/frequency bins, that is not allocated to one of the user devices. The noise determiner determines a level of interfering noise based on noise in the resource block that is not allocated to one of the user devices.

Further, in accordance with an embodiment, the noise detector includes a unit to measure noise in at least one time/frequency resource block that is signaled as being not allocated to one of the user devices for transmission.

Still further, in accordance with an embodiment, the noise detector includes a unit to measure noise in at least one time/frequency resource block that is signaled as being available to other user devices.

Moreover, in accordance with an embodiment, the noise determiner includes a noise averager to average the amount of noise from multiple time periods.

Further, in accordance with an embodiment, the receiver includes a virtual user receiver to receive allocations designated for a virtual user device.

Additionally, in accordance with an embodiment, the receiver includes a searcher to search for the allocations to the virtual user device in a user search space or a common search space of an allocation channel.

Further, in accordance with an embodiment the noise is measured within different time/frequency resources.

Moreover, in accordance with an embodiment, the user device forms part of a cellular communication system. For example, the cellular communication system can be an LTE system.

There is also provided, in accordance with an embodiment of the present disclosure, a method for communication by a base station. The method includes allocating at least one time/frequency resource block at least to currently active user devices that are communicating with the base station and signaling that at least one of the time/frequency resource blocks, comprising plural time/frequency bins, is available for noise measurements.

Further, in accordance with an embodiment, the method includes assigning the time/frequency resource block that is available for use by the currently active user devices to a virtual user device.

Still further, in accordance with an embodiment, the assigning includes allocating resources to the virtual user device in a similar manner as the allocation of time/frequency resource blocks to the currently active user devices.

Moreover, in accordance with an embodiment, the method includes changing an allocation of time/frequency resource blocks among the user devices that currently require a resource and the virtual user device between time periods.

Additionally, in accordance with an embodiment, the signaling includes signaling the allocations to the virtual user device in either a user search space or a common search space of an allocation channel.

Still further, in accordance with an embodiment, the method further includes not transmitting during the time period signals on a time/frequency resource that is signaled as being available for use by any of the user devices.

Additionally, in accordance with an embodiment, the method further includes, between time periods, rotating frequencies of the time/frequency resource that is signaled as being available for use by any of the user devices. Such rotation can be rotation is random and/or it can be such to provide a distribution of sampling locations throughout the time-frequency space.

Further, in accordance with an embodiment, the base station forms part of a cellular communication system. For example, the cellular communication system can be an LTE system and/or it can perform OFDMA wireless communication.

There is still further provided, in accordance with an embodiment of the present disclosure, a base station including a user allocator and a signaler. The user allocator allocates at least one time/frequency resource block at least to currently active user devices that are communicating with the base station. The signaler signals that at least one of the time/frequency resource blocks, comprising plural time/frequency bins, is available for noise measurements.

Finally, there is provided, in accordance with an embodiment of the present disclosure, a method for a communication system. The method includes allocating at least one time/frequency resource block at least to currently active user devices that are communicating with the base station, signaling that at least one of the time/frequency resource blocks, comprising plural time/frequency bins, is available for noise measurements, user devices measuring noise in the time/frequency resource block that is signaled as being available and the user devices determining a level of interfering noise based on noise in the resource block that is available.

BRIEF DESCRIPTION OF THE DRAWINGS

Embodiments of the present disclosure, both as to organization and method of operation, may best be understood by reference to the following detailed description when taken together with the accompanying drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Figure 2A:
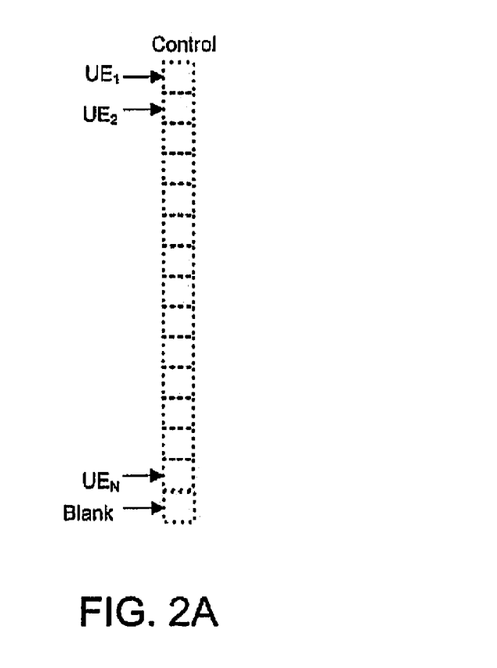
FIG. 2A is an illustration of a downlink control channel allocation, constructed and operative in accordance with an embodiment.

Reference is now made to FIG. 2A, which illustrates a downlink control channel structure, constructed and operative in accordance with an embodiment. As in FIG. 1A, the various UEs receive allocations. However, in accordance with this embodiment, a further, virtual UE, labeled "Blank", also receives an allocation. The Blank virtual UE may be allocated any region 20 or portion of a region, such as one or more bins 22, which the base station may otherwise not have allocated to the currently active UEs.

Figure 2B:
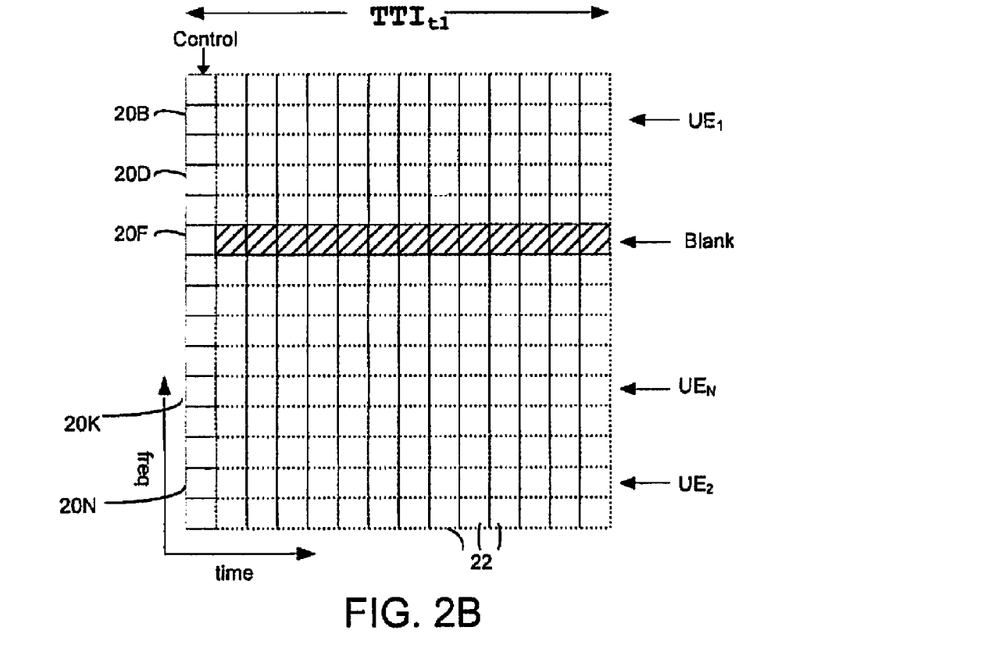
FIGS. 2B, 2C and 2D are illustrations of three alternative allocations of the resources of two TTIS, constructed and operative in accordance with an embodiment.
Figure 2C:
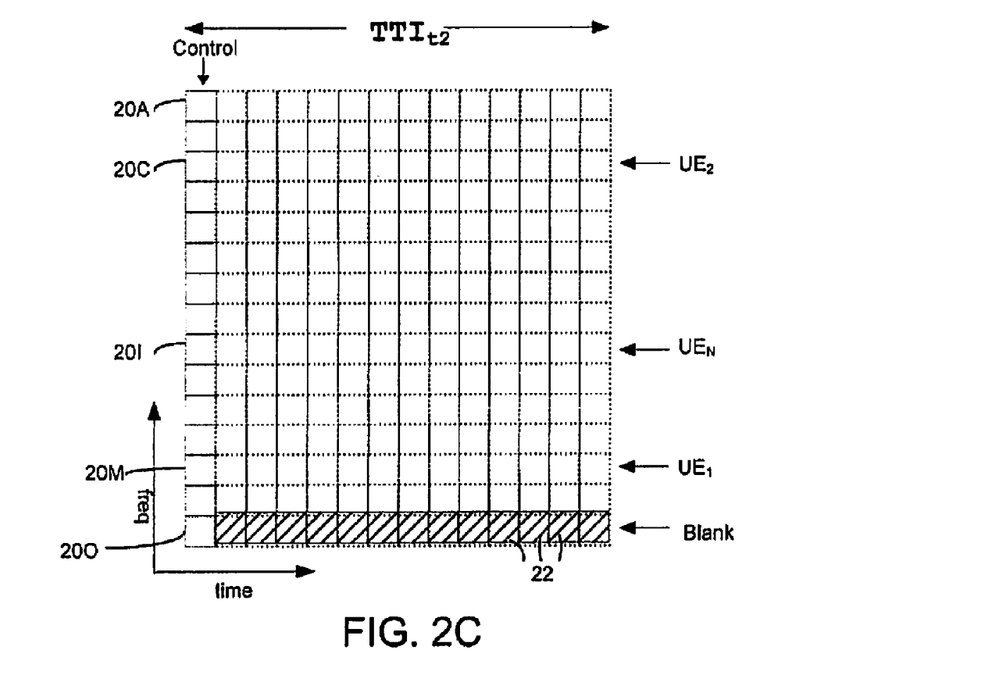
Figure 2D:
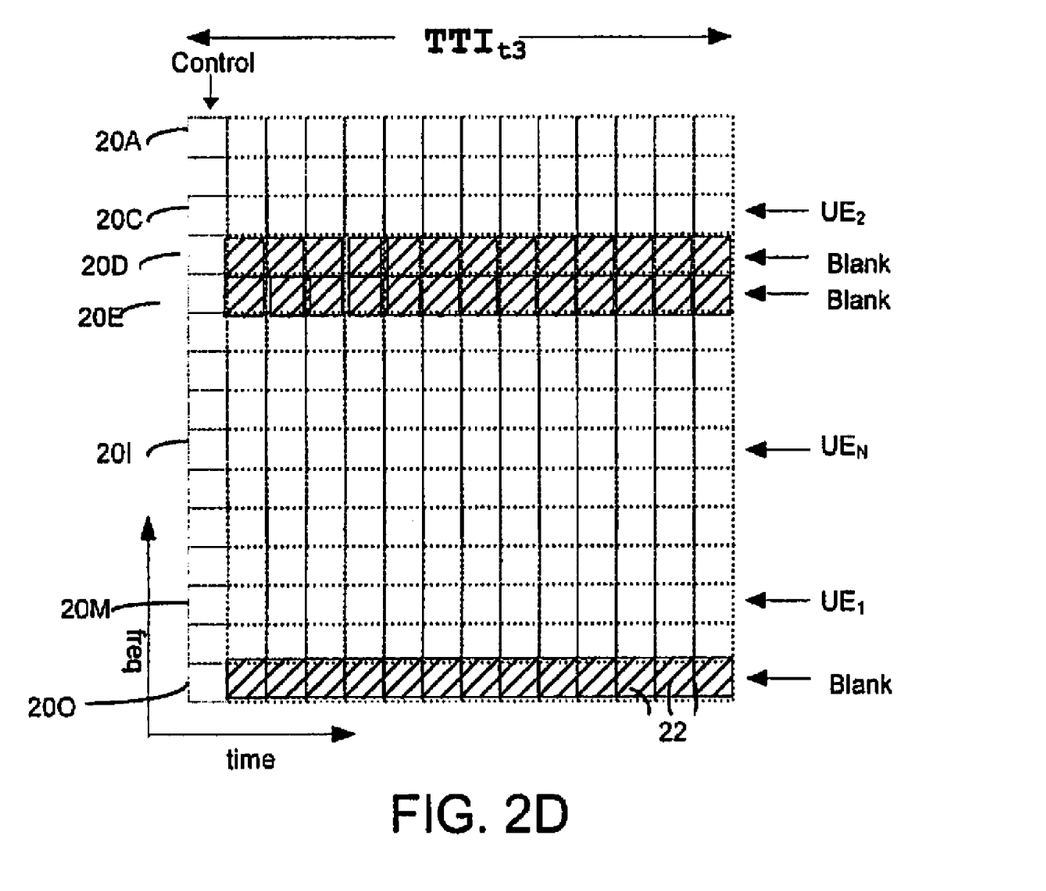

Reference is now made to FIGS. 2B, 2C and 2D, which illustrate three transmission time intervals (TTIs), $TTI_{t1}$, $TTI_{t2}$ and $TTI_{t3}$, respectively, constructed and operative in accordance with an embodiment. Allocations of physical resource blocks (PRBs) 20 to active user devices $UE_1$, $UE_2$ and $UE_N$ are shown. As can be seen, these allocations vary. In FIG. 2B, at time interval $TTI_{t1}$, $UE_1$ receives PRB 20B, $UE_2$ receives PRB 20N and $UE_N$ receives PRB 20K. In FIG. 2C, at time interval $TTI_{t2}$, $UE_1$ receives PRB 20M, $UE_2$ receives PRB 20C and $UE_N$ receives PRB 20I.

In FIGS. 2B, 2C and 2D, the Blank virtual UE also received a time-frequency allocation. The Blank virtual UE may be allocated any PRB 20 which the base station otherwise may have not allocated to currently active UEs. As can be seen in FIGS. 2B and 2C, the Blank virtual UE may be allocated PRB 20F, during $TTI_{t1}$, and to PRB 20O during $TTI_{t2}$. In FIG. 2D, the Blank virtual UE has been allocated several PRB's, PRB 20D, PRB 20E and PRB 20O.

Figure 3:
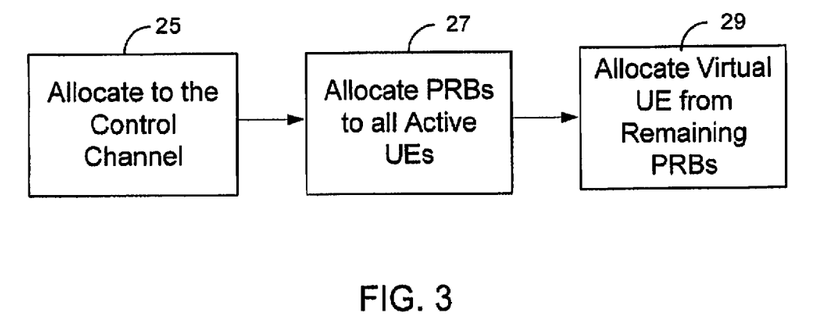
FIG. 3 is a flowchart illustration of a method of allocating the resources of FIGS. 2A, 2B, 2C and 2D, constructed and operative in accordance with an embodiment.

Reference is now briefly made to FIG. 3, which illustrates the operation of the base station. To create each of the time intervals $TTI_{t1}$, $TTI_{t2}$ and $TTI_{t3}$, the base station may first allocate (step 25) the first column, or the first few columns, of the TTI to the control channel (step 25). It may then allocate (step 27) PRBs to the active user devices (in this example, to $UE_1$, $UE_2$ and $UE_N$). Finally, in step 29, if the network is lightly loaded, it may allocate to the Blank virtual UE from any remaining unallocated PRBs or portions thereof.

In accordance with an embodiment, the base station may communicate the allocations of time-frequency resources, including the allocation to the Blank virtual UE, to all UEs that it currently is serving. Such communication may be provided as a part of regular PRB signaling (such as is shown in FIG. 2A) or though other suitable signaling. Thus, upon receiving signals indicating a time-frequency allocation, or group of allocations, for a TTI, each UE may search the control channel allocation to find its own time/frequency allocation (such as by decoding with its own ID) and a time-frequency allocation for the Blank virtual UE (such as by decoding with a general ID). Each UE then may utilize its allocated data PRB 20 (or an allocated time-frequency bin 22) for data transmissions, and may utilize the Blank virtual UE PRB 20 (or a blank time-frequency bin 22), which is absent of any transmissions, for measuring interference and noise.

It is noted that the PRBs 20 which are allocated to the Blank virtual UE may change dynamically in accordance with regular scheduling and/or resource rotation. Accordingly, the noise and/or interference measured in these time-frequency regions may also be dynamic. While it is possible that, over a period of a several TTIs, the Blank virtual UE may randomly receive allocations for all or most of PRBs 20, thereby providing well distributed sampling locations for the noise estimation throughout the time-frequency space, it is noted that suitable algorithms may also be provided to specifically drive a rotation of time-frequency regions allocated to the Blank UE to ensure a comprehensive (or weighted) distribution of sampling locations for noise estimation throughout the time-frequency space.

Similarly, it is possible that only specific bins 22 be allocated to the Blank virtual UE. However, in contrast to the conventional allocation of time-frequency bins, such as is shown in FIGS. 1A and 1B, in accordance with an embodiment of the present disclosure, the allocated bins are not located at fixed time-frequency bins; instead they may be rotated over a range of time-frequency possibilities. Consequently, embodiments of the present disclosure may provide an improved distribution of sampling locations in a data channel over time, a reduction in the number of required time-frequency resources for noise estimation, and an increase in the available bins for data transmission.

Figure 4:
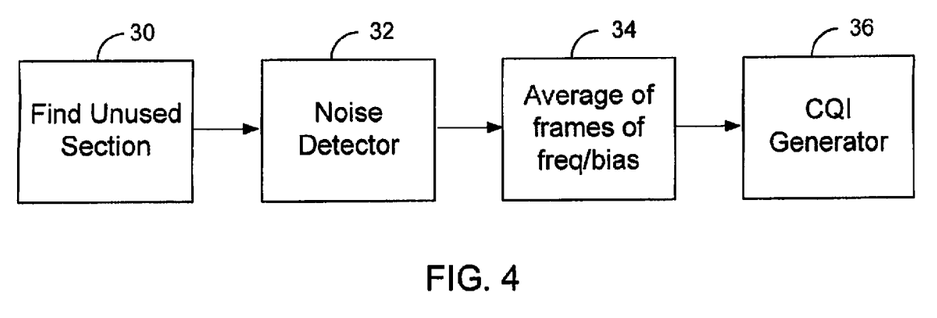
FIG. 4 is flowchart illustration of a method of utilizing the allocations of FIGS. 2A, 2B, 2C and 2D to measure channel quality.

Reference is now made to FIG. 4, which illustrates a method for operating a UE to utilize otherwise unused PRBs that are allocated to a Blank virtual UE in accordance with an embodiment of the disclosure.

A UE may search (step 30) the control channel of a current TTI for allocations to its data channel, to the Blank virtual UE and the resource allocation to the control channel in the next TTI.

A UE may then apply a noise detector to detect noise (step 32) in a PRB 20, or bin(s) 22, that is allocated to the Blank virtual UE, thereby detecting noise in that portion of the time-frequency space. At the end of an allocated noise measurement time, the UE may average the noise measurements from the current TTI with frames received from previous measurements. An averaged noise measurement performed on time frequency resources for the virtual Blank UE may be utilized to generate a CQI (channel quality indication) report (step 36).

On the base station side, the base station may define a virtual Blank UE with an ID that is communicated to all UEs currently served by the base station. The base scheduler may dynamically rotate the location of time-frequency resources allocated to the virtual Blank UE using the same methodologies as applied to other UEs in the cell which communicate with the base station, or using other methodologies so as to ensure some desired distribution over time, uniform or weighted, of blank time-frequency resources throughout an available time-frequency space. The otherwise unused resources of the virtual Blank UE that may be utilized for noise measurement and/or interference estimation, may be signaled using a conventional PDCCH message which is periodically transmitted to the UEs in the cell. Optionally, a dedicated message for signaling unused resources may be employed. As previously noted, the resource allocation to the virtual Blank UE may be the same as to other UEs, with the exception, however, that the resource information in that message corresponds to unused time-frequency resources, whether a PRB 20 or bin(s) 22, in which no downlink data will be transmitted.

This method may be applied to single virtual Blank UEs or to multiple Blank-UEs when sufficient bandwidth is available, thereby adaptively dimensioning the quantity of unused resources which are available for noise measurement.

It is noted that the base station may selectively choose to transmit or not to transmit a PDCCH message indicative of available unused time-frequency resources at any TTI subframe. This flexibility may allow, for instance, the base station to send Blank-UE messages when the cell is lightly loaded (in which case there may be little or no cost to the extra control information, yet the UEs may gain significantly from blank time-frequency resources that are available for noise measurement), and not transmit such messages when the cell is heavily loaded (in which case there may be a non-zero cost to the extra control information, accompanied by merely a small gain for the UEs from the measurements).

The methods described hereinabove may be implemented in various different ways for different cellular standards. For E-UTRA, there may be several design considerations which may make the described method more efficient.

In E-UTRA, UEs search for PDCCH messages in a specific search space corresponding to their ID. Furthermore, E-UTRA also defines another search space called PDCCH common space, where all UEs search for messages intended for all or subsets of UEs.

In accordance with embodiment of the disclosure, the Blank-UE message may be located in the PDCCH common space and treated as any other common PDCCH message. In such case, the ID of the Blank-UE will be determined, in a similar manner to the other common messages, in compliance with E-UTRA specifications. UEs may be required to search over the entire common area for every subframe, or possibly every predetermined number of subframes. The specific location of messages within the PDCCH common space indicating virtual Blank UE resources may be at a predetermined fixed location, or may be at a location that is flexible.

Alternatively, messages indicating time-frequency resources allocated to the virtual Blank-UE may be placed in the UE-specific area. In this embodiment, the base station may choose a Blank-UE ID and may convey that ID to all UEs on a common downlink control channel, for example. When searching for its own resource allocation, each UE in a cell may perform an additional search in the virtual Blank-UE search area to identify any time-frequency resources allocated to the virtual Blank-UE.

In accordance with emerging E-UTRA standards, PDCCH messages may be transmitted in various formats. These formats may be configured semi-statically on a per UE basis or each UE may decode them. A PDCCH format may specify the total PDCCH payload size as well as the size and packing order of various bit fields. In accordance with an embodiment of the present disclosure, the Blank virtual UE message may use one of the already available payload formats.

It is noted that a resource allocation message for a virtual Blank UE may only utilize a single PRB allocation bit field in PDCCH messaging, and may not require use of any of the other common PDCCH bit fields. Thus, in accordance with an embodiment, messaging for the virtual Blank UE may be specific to the virtual Blank UE and may robustly describe the mapping of all or some unused PRBs. Alternatively, PRB allocation fields of types that are already defined in current and emerging specifications may be packed into a single message which is suitably mapped in the base station. The base scheduler may generate a suitable map indicative of the blank resources merely by adding a virtual Blank UE to its scheduling task.

The set of relevant formats for unused resource signaling may depend on the option adopted for location in the PDCCH of signals identifying the virtual Blank-UE. If it is located, for instance, in the common PDCCH space, the Blank UE message format size may be consistent with formats used for PDCCH common messages. Alternatively, if the virtual Blank-UE is assigned an ID in the same manner as other UEs, the format size should be consistent with formats used for UE specific messages. In the latter case, in the disclosed embodiment corresponding to E-UTRA networks, the base station may also broadcast a MIMO mode for the Blank-UE.

In accordance with an embodiment of the disclosure that is applicable to E-UTRA communications, payload bit sizes (excluding the 16-bit CRC) for the downlink-PDCCH grants may be as follows, where the format relates to a transport format indicative of modulation and coding. These formats correspond to a 20 MHz bandwidth; similar formats may be provided for other bandwidths:

| | |
|---|---|
| Format 1C | 10 bits |
| Format 1A | 28 bits |
| Format 1 | 39 bits |
| Format 2 | 55 bits |

It is noted that in accordance with emerging E-UTRA specifications, PRB allocation types and their corresponding bit-sizes, for the 20 MHz bandwidth, are may be as follows:

| | |
|---|---|
| Type 0 or 1: | 25 + 1 (fragmented allocation, plus 1 bit to indicate type 0 or 1 mapping) |
| Type 2 or distributed: | 13 + 1 (contiguous or distributed, indicated by 1 more bit) |
| Type 1c | 5 |

Inasmuch as virtual blank-UE messages are constrained to have a total payload size that is equal to that of one of the already-defined formats (1C, 1A, 1, 2), as noted above, and assuming that the allocation-field embedded in this message is one or more of the already agreed types (0/1, 2 or 1c), multiple PRB-allocation fields contained within a single message, for the 20 MHz bandwidth example, may be as follows:

| | |
|---|---|
| Format 1C: | 2 × type1c = 10 bits |
| Format 1A: | Two options to use the 28 payload bits: |
| | a) 1 × type0/1 = 26 bits (2 bits are left unused) |
| | b) 2 × type2 = 28 bits |
| Format 1: | 1 × type0/1 + 1 × type2 contiguous = 26 + 13 = 39 bits |
| Format 2: | 2 × type0/1 = 52 bits (3 bits are left unused) |

It is noted that signaling of unused-resources by a cellular network may be used for purposes other than noise measurement and interference estimation by the UEs. For example, signaling of unused resources may be utilized by cognitive radio transmission systems (that is radio transmission systems that are aware of the presence of the cellular network) to monitor its unused-resources messages and to dynamically plan their own transmissions such that they utilize only the unused cellular network resources and thereby avoid causing interference to the cellular network.

Principles of the present disclosure may be applied to cellular systems and networks other than E-UTRA systems and network. For example, its disclosed methodologies may apply to Wimax (IEEE 16E, 16M, etc) networks, WiFi and other suitable radio networks.

Unless specifically stated otherwise, as apparent from the disclosure herein, any "processing," "computing," "calculating," "determining," or similar operations, refer to operations that may be performed in dedicated computing hardware, or in a generalized computer device using firmware or software.

While certain features of embodiments of the invention have been illustrated and described herein by way of example, many modifications, substitutions, variations, changes, combinations and equivalents may be apparent to those of ordinary skill in the art. Accordingly, the scope of the present invention as embodied in the claims appended hereto is intended to cover all such modifications, substitutions, variations, changes, combinations and equivalents occurring to a person of ordinary skill based on the foregoing description and which are not disclosed in the prior art.

What is claimed is:

1. A method for communication by a user device on a wireless network, the method comprising:
receiving a downlink communication from a base station, the downlink communication indicating an allocation of time/frequency resource blocks at least to user devices that are communicating with the base station;
measuring noise in a time/frequency resource block that is not allocated to one of the user devices for transmission;
determining a level of interfering noise based on noise in the time/frequency resource block that is not allocated to the one of the user devices,
wherein the measuring is performed in at least one of the time/frequency resource blocks that is signaled as being available to other user devices; and
receiving at the user device a blank user equipment message that is generated based on a load level of a cell transmission area of the base station, wherein the blank user equipment message is received when the cell transmission area is loaded at a first level and is not received when the cell transmission area is loaded at a second level, and wherein the second level is different than the first level.

2. The method according to claim 1, wherein the measuring is performed in at least one of the time/frequency resource blocks that is signaled as being not allocated to the one of the user devices for transmission.

3. The method according to claim 1, wherein the determining comprises averaging an amount of noise from multiple time periods.

4. The method according to claim 3, wherein the noise is measured within different time/frequency resource blocks.

5. The method according to claim 1, wherein the receiving also comprises receiving allocations designated for a virtual user device.

6. The method according to claim 5, wherein the receiving comprises searching for the allocations to the virtual user device in one of the following search spaces of an allocation channel: a user search space and a common search space.

7. The method according to claim 1, further comprising searching for blank user equipment allocations by the user device,
wherein the measuring is performed based on the blank user equipment allocations.

8. The method according to claim 1, further comprising randomly allocating the time/frequency resource block that is not allocated to the one of the user devices.

9. The method according to claim 1, further comprising rotating the time/frequency resource block that is not allocated to the one of the user devices over a plurality of channels.

10. The method according to claim 1, wherein:
the base station transmits a packet data control channel signal to the user device; and
the packet data control channel signal comprises the blank user equipment message.

11. The method according to claim 1, wherein the blank user equipment message comprises a map of time/frequency resource blocks that are not used by the user devices.

12. The method according to claim 1, wherein the blank user equipment message comprises:
allocating a first time/frequency resource block for a first virtual user device; and
allocating a second time/frequency resource block for a second virtual user device, wherein:
the first time/frequency resource block allocation includes a first allocation type and a first bit size; and
the second time/frequency resource block allocation includes a second allocation type and a second bit size.

13. The method according to claim 12, wherein:
the first allocation type is fragmented; and
the second allocation type is at least one of contiguous and distributed.

14. The method of claim 1, wherein the downlink communication from the base station indicates allocation of a bandwidth carrier and a frequency assigned for measuring noise in the time/frequency resource blocks that are not allocated to the user devices for signal transmission.

15. The method of claim 14, wherein the downlink communication indicates allocation of a plurality of bandwidth carriers and a plurality of frequencies for blank virtual user equipment devices and noise measurement.

16. The method of claim 14, wherein the time/frequency resource blocks that are not allocated to the one of the user devices are randomly allocated in frequency.

17. The method of claim 1, wherein the time/frequency resource blocks that are not allocated to the one of the user devices are rotated in frequency.

18. The method of claim 1, wherein the blank user equipment message indicates which ones of the time/frequency resource blocks are unused.

19. The method of claim 1, wherein the second level is greater than the first level.

20. The method of claim 1, wherein the blank user equipment message indicates a frequency that is not allocated to a user device.

21. A user device for communicating on a wireless network, the user device comprising:
a receiver to receive a downlink data communication from a base station, the downlink data communication indicating an allocation of time/frequency resource blocks at least to user devices that are communicating with the base station;
a noise detector to measure noise in a time/frequency resource block that is not allocated to one of the user devices for transmission; and
a noise determiner to determine a level of interfering noise based on noise in the time/frequency resource block that is not allocated to the one of the user devices,
wherein the noise detector comprises a unit to measure noise in at least one of the time/frequency resource blocks that is signaled as being available to other user devices,
wherein the receiver is configured to receives a blank user equipment message that is generated based on a load level of a cell transmission area of the base station,
wherein the receiver receives the blank user equipment message when the cell transmission area is loaded at a first level and does not receive the blank user equipment message when the cell transmission area is loaded at a second level, and wherein the second level is different than the first level.

22. The user device according to claim 21, wherein the noise detector is configured to measures noise in at least one of the time/frequency resource blocks that is signaled as being not allocated to the one of the user devices for transmission.

23. The user device according to claim 21, wherein the noise determiner comprises a noise averager configured to average an amount of noise from multiple time periods of at least one time/frequency resource block including the time/frequency resource block that is not allocated to the one of the user devices.

24. The user device according to claim 23, wherein the noise is measured within different ones of the at least one time/frequency resource block.

25. The user device according to claim 21, wherein the receiver comprises a virtual user receiver configured to receive allocations designated for the virtual user receiver.

26. The user device according to claim 25, wherein the receiver comprises a searcher configured to search for the allocations to the virtual user receiver in one of the following search spaces of an allocation channel: a user search space and a common search space.

27. The user device according to claim 21, wherein the user device forms part of a cellular communication system.

28. The user device according to claim 27, wherein the cellular communication system is an LTE system.

* * * * *